US005392313A

United States Patent [19]

Noro

[11] Patent Number: 5,392,313

[45] Date of Patent: Feb. 21, 1995

[54] REMOTE CONTROL SIGNAL REPEATER HAVING A BANDPASS FILTER AND A LEVEL SLICER

[75] Inventor: Masao Noro, Hamamatsu, Japan

[73] Assignee: Yamaha Corporation, Japan

[21] Appl. No.: 846,542

[22] Filed: Mar. 4, 1992

[30] Foreign Application Priority Data

Mar. 7, 1991 [JP] Japan .................................... 3-67866
Mar. 13, 1991 [JP] Japan .................................... 3-73814

[51] Int. Cl.[6] .............................................. H04B 3/36

[52] U.S. Cl. .......................................... 375/4; 375/3; 455/307

[58] Field of Search ..................... 375/3, 4; 455/7, 15, 455/23, 307; 359/174, 175, 176

[56] References Cited

U.S. PATENT DOCUMENTS 3,179,889 4/1965 King ....................................... 375/4
3,502,985 3/1970 Masayasu ................................. 375/4
4,563,651 1/1986 Ohta et al. ........................... 455/266
4,809,359 2/1989 Dockery .............................. 359/176
4,897,883 1/1990 Harrington .......................... 359/176

*Primary Examiner*—Stephen Chin
*Assistant Examiner*—T. Ghebretinsae
*Attorney, Agent, or Firm*—Graham & James

[57] ABSTRACT

In a remote control signal repeater, which transmits remote control signals from a remote controller to a main device, having a bandpass filter and a level slicer, the bandpass filter is constructed of a parallel LC resonant circuit and a serial LC resonant circuit connected to each other. The resonant frequencies of the respective resonant circuits are set to the substantially same frequency. A resultant resonant characteristic having two peaks on sides of the original resonant frequency of the parallel LC resonant circuit is obtained and resonance of the serial LC resonant circuit is produced between the two peaks, thereby flattening the portion between the two peaks. The level slicer connected to the bandpass filter includes a class-C amplifier which level-slices output of the bandpass filter, a smoothing circuit which smoothes output of the class-C amplifier and a bias control circuit which variably controls the degree of class-C bias in accordance with a smoothed output of the smoothing circuit. When an undesirable continuous noise is received by a light receiving element, the class-C bias increases to cut off the received continuous noise and when a remote control signal is received, the class-C bias decreases to output the received remote control signal.

15 Claims, 13 Drawing Sheets

INPUT SIGNAL
(REMOTE CONTROL SIGNAL)

WAVEFORM AT
POINT A

SMOOTHED
OUTPUT

OUTPUT OF OUTPUT
TERMINAL 140

INPUT SIGNAL
(CONTINUOUS NOISE
PLUS REMOTE
CONTROL SIGNAL)

WAVEFORM AT
POINT A

SMOOTHED
OUTPUT

OUTPUT OF OUTPUT
TERMINAL 140

REMOTE CONTROL SIGNAL REPEATER HAVING A BANDPASS FILTER AND A LEVEL SLICER

BACKGROUND OF THE INVENTION

This invention relates to a remote control signal repeater for transmitting a remote control signal and, more particularly, to a remote control signal repeater having a bandbass filter and a level slicer capable of preventing an erroneous operation of a remote controlled device due to noise mixed in a remote control signal.

A remote control signal repeater is a device for transmitting a remote control signal such as an infrared signal to a separate location such as a separate room. A general structure of a repeater is shown in FIG. 2. In FIG. 2 is shown an example in which an infrared remote control signal is transmitted from a room 12 to a room 14. A repeater 10 includes, a light receiving element 16 such as a photodiode, an amplifier 17, a bandpass filter 18, a level slicer 19 and a light emitting element 20 such as an infrared light emitting diode. The light receiving element 16 is provided in the room 12 and receives infrared remote control signals 24, 25 and 26 outputted in the form of intermittent pulses from different types of infrared remote controllers 21, 22 and 23. The received signals are amplified by the amplifier 17 and a necessary band of the received signals is passed by the bandpass filter 18. The bandpass filter 18 is provided for eliminating noise occurring in frequencies on either side of the necessary band for transmitting the infrared remote control signals. Noise mixed in a signal of the band passed by the passed bandpass filter 18 is cut off by the level slicer 19. The light emitting element 20 is provided in the room 14 and driven by an output signal of the level slicer 19 to output infrared pulse remote control signals 24', 25' and 26' which coincide with the infrared remote control signals 24, 25 and 26. These infrared remote control signals 24'-26' are received by light receiving sections of main devices 28, 29 and 30 provided in the room 14 to perform operations as instructed by the infrared remote controllers 21-23. In this manner, the devices 28-30 can be controlled from the separated room 12 by using the infrared remote controllers 21-23.

In the room 12, there exist various types of noise due to light (noise light) occurring from various sources such as light generated by a fluorescent lamp. Also another type of noise is generated by the light receiving element 16 and the amplifier 17. The light receiving element 16 provided for receiving the infrared remote control signal is made of a photodiode and picks up the noise light because the photodiode 16 has an ability to convert not only infrared but also visible light. The bandpass filter 18 eliminates noises occurring in the frequencies on either side of the necessary band.

A bandpass filter circuit is generally constructed of an LC resonant circuit as shown in FIG. 3. Since a bandpass filter of a remote control signal receiving circuit provided in each device to be controlled by a remote controller has only to be operated by a remote control signal of a single carrier frequency, a signal of a frequency other than the carrier frequency can be accurately eliminated and an accurate operation of each device can thereby be ensured by setting Q in the frequency characteristic of the LC resonant circuit at a high value as shown in FIG. 4.

In the case of a repeater, however, various remote control output signals (having generally carrier frequencies ranging from 30 kHz to 40 kHz) must be transmitted and, therefore, the bandpass filter 18 must have a sufficient band width to cope with such various remote control signals for this purpose, the bandpass filter 18 of a conventional repeater is made of a combination of plural CR filters and thereby provides a characteristic as shown in FIG. 5 which is obtained by superposing 6 dB/oct curves to obtain the necessary band width of 30 kHz to 40 kHz.

The bandpass filter 18 having the characteristic of FIG. 5, however, has the disadvantage that, since the attenuating characteristic of the filter in frequencies other than the necessary band is rather gradual, response in the unnecessary frequency region increases and the bandpass filter 18 therefore tends to pick up noises resulting in deterioration of the signal-to-noise ratio and increased possibility of an erroneous operation of the devices receiving remote control signals.

It is, therefore, an object of the invention to provide a remote control signal repeater having an improved bandpass filter circuit which can secure a necessary band width and yet realize a sharp attenuating characteristic in frequencies other than the necessary band and thereby prevent an erroneous operation of devices due to noises.

Reverting to FIG. 2, high frequency components of noise light and noises generated by the light receiving element 16 and the amplifier 17 exist not only in the outside of the carrier frequency of the remote control signals but also in the vicinity of the carrier frequencies of the remote control signals and the bandpass filter 18 cannot eliminate these noises because they exist inside of the necessary band of the bandpass filter 18, Since, as described above, the band of the bandpass filter 18 of the repeater is set at a relatively large width for the requirement of transmitting various remote control signals having generally carrier frequencies ranging from 30 kHz to 40 kHz, a significant amount of noise is outputted by the repeater 10 without being eliminated by the conventional bandpass filter 18.

For eliminating noises which have thus passed the bandpass filter 18, the level slicer 19 is provided. The level slicer 19 inhibits outputting of a signal below a predetermined level, regarding it as a noise. For enabling the level slicer 19 to operate accurately, a noise of a large amplitude outside of the necessary band must be eliminated by the bandpass filter 18.

A conventional level slicer utilizes a rising characteristic of a transistor or a diode. An example of such conventional level slicer is shown in FIG. 14. A received signal which has been attenuated in frequencies outside of the necessary band by the bandpass filter 18 (FIG. 2) and amplified to some extent is applied to an input terminal 132. This received signal is attenuated in its direct current component by a capacitor C110 and supplied to a transistor Q110 without bias and led to an infrared LED (light emitting diode) 20. The operation of the level slicer 19 of FIG. 14 is shown in FIG. 16. The transistor Q110 is turned on and drives the infrared LED 20 when an input signal is above a junction voltage (about 0.6 V) thereof. By cutting off a signal below the junction voltage in this manner, a noise in the band is eliminated.

In the conventional level slicer 19 shown in FIG. 4, it would be ideal if the voltage-current characteristic of the junction voltage of the transistor Q110 was one shown by the dotted line in FIG. 15. In actuality, however, the voltage-current characteristic is one shown by the solid line in FIG. 15 and this is disadvantageous in that a remote control signal cannot be separated clearly from a noise.

Moreover, since the slicing level is a fixed value in the conventional level slicer, a sufficient effect of the slicer cannot be obtained when the level of a noise is excessively large. If the slicing level is set at a large level to cope with such noise of a large level, an infrared remote control signal coming from a distant remote controller will not be able to exceed the slicing level, so that an allowable distance of a remote controller will have to be shortened.

It is, therefore, another object of the invention to provide a-remote control signal repeater having an improved level slicing circuit capable eliminating a noise within the necessary band effectively and thereby preventing an erroneous operation of devices due to noises.

SUMMARY OF THE INVENTION

A remote control repeater achieving the first object of the invention which transmits a remote control signal from a remote controller to a main device comprises remote control signal receiving means for receiving a remote control signal produced by the remote controller, the remote control signal having a carrier frequency, filtering means for inputting a remote control signal received by the remote control signal receiving means and outputting a signal within a predetermined frequency range to pass the carrier frequency from the inputted received remote control signal, the filtering means comprising, a parallel resonant circuit having a resonant frequency, a serial resonant circuit connected to the parallel resonant circuit, the serial resonant circuit having substantially the same resonant frequency as the resonant frequency of the parallel resonant circuit, and remote control signal outputting means for outputting an output of the filtering means to the main device.

According to the invention, the parallel resonant circuit interferes with the serial resonant circuit to produce a resonant characteristic having two peaks on sides the original resonant frequency of the parallel resonant circuit. Since resonance of the serial resonant circuit is produced between the two peaks, the portion between the two peaks is flattened and a necessary band width can be obtained in this flattened portion. In this case, Q of the respective resonant circuits may be high and, therefore, the attenuating characteristic in portions other than the necessary band can be made sharp whereby an erroneous operation of devices to be controlled by the remote control signals due to noises occurring in the portions other than the necessary band can be effectively prevented. Besides, since the two resonant circuits may have substantially the same resonant frequency, the circuit design can be facilitated.

For achieving the second object of the invention, a remote control signal repeater which transmits a remote control signal from a remote controller to a main device comprises remote control signal receiving means for receiving a pulse remote control signal produced by the remote controller, the pulse remote control signal having a carrier frequency, level slicing means for cutting off a noise in a pulse remote control signal received by the remote control signal receiving means, the level slicing means comprising, class-C bias amplifying means for class-C bias amplifying the received pulse remote control signal from the remote control signal receiving means, smoothing means for smoothing an output of the class-C bias amplifying means with a predetermined time constant, and bias control means for controlling a class-C bias amount of the class-C bias amplifying means in response to a smoothing output of the smoothing means, and remote control signal outputting means for outputting an output of the level slicing means to the main device.

In this aspect of the invention, difference in nature between a remote control signal and a noise signal causing an erroneous operation of a main device is utilized. Amplitude modulation is used as a modulation system for an infrared remote control signal. This modulation is performed by a binary representation of ON and OFF. That is, a Higher level is a state where there is a carrier and a Lower level is a state where there is no carrier. Accordingly, an erroneous operation mostly occurs when the Lower level becomes the Higher level due to a noise and the opposite case, i.e., the Higher level becomes the Lower level, can hardly occur. Besides, since a remote control signal has duration of Higher level for at least about 20 cycles of the carrier wave, a remote control received signal detection circuit in each device to be controlled by the remote control signal is so designed that it will not respond to a signal of several cycles or less.

There are two types of waveforms of noises which have passed through the bandpass filter, i.e., a pulse-like noise as shown in the upper stage of FIG. 17 and a continuous noise as shown in the lower stage of FIG. 17.

The pulse-like noise does not pose a problem because, as described above, a remote control received signal detection circuit in each main device does not respond to this type of noise. On the other hand, the continuous noise tends to cause an erroneous operation even when its level is lower than the pulse-like noise. An erroneous operation of each main device therefore can be substantially prevented if the continuous noise can be eliminated.

Compared with a continuous noise, a remote control signal is always an intermittent signal. Therefore, when they are smoothed by a smoothing circuit, a continuous noise produces a large smoothed output and a remote control signal produces a small smoothed output even if their peak values are the same.

In this invention, a received signal is applied to a class-C bias amplifying circuit for level slicing and class-C bias is increased or decreased in accordance with an output obtained by smoothing the output of the class-C bias amplifying circuit in such a manner that class-C bias is increased when the smoothed output is increased and decreased when the smoothed output is decreased. Further, in the level slicing circuit of this invention, the bias of the class-C bias amplifier can be controlled by smoothing a signal of the input side of the amplifier.

According to this aspect of the invention, a smoothed output of a continuous noise becomes larger than its peak value and, therefore, class-C bias is increased and the noise is cut off by the level slicing by the class-C bias amplifying circuit. In the case of a remote control signal, its smoothed output becomes smaller than its peak value and, therefore, class-C bias is decreased and the remote control signal is outputted without being subjected to the level slicing. In this manner, a continuous noise which causes an erroneous operation of a device can be effectively eliminated. The invention is advantageous still further because class-C bias is changed in accordance with the level of a remote control signal (i.e., class-C bias is decreased when the level is decreased) and, accordingly, a remote control signal transmitted from a distant location can be retransmitted from the repeater without shortening of reaching distance of the remote control signal.

Embodiments of the invention will be described below with reference to the accompanying drawings.

BRIEF DESCRIPTION OF THE DRAWINGS

In the accompanying drawings,

FIGS. 20A and 20B are diagrams showing a voltage distribution state in the circuit of FIG. 18 in which FIG. 20A shows a bias state without an input signal and FIG. 20B shows a bias state at the maximum continuous noise input;

DESCRIPTION OF PREFERRED EMBODIMENTS

Figure 1:
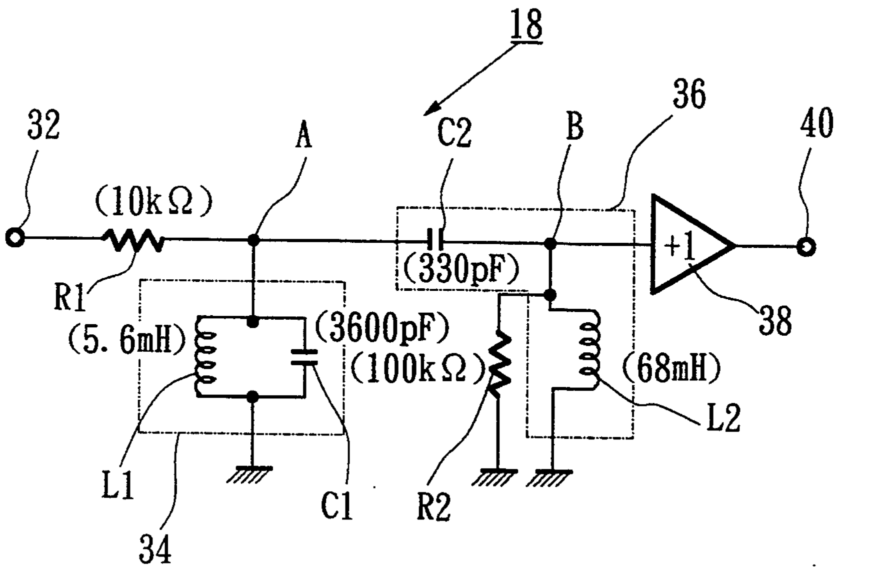
FIG. 1 is a circuit diagram showing an example of a bandpass filter incorporated in the repeater of the invention.
Figure 2:
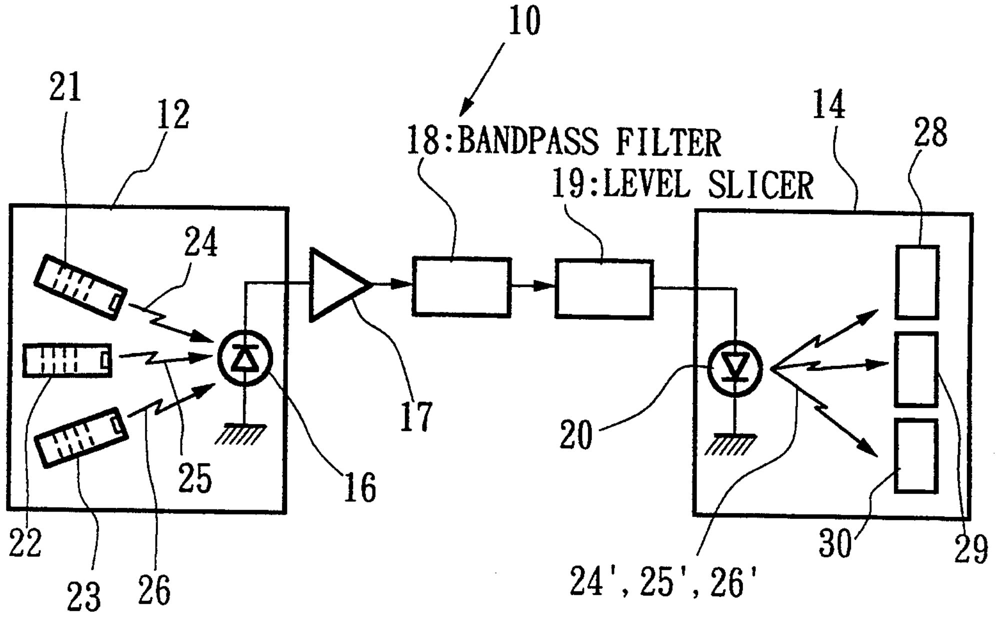
FIG. 2 is a block diagram showing a general construction of a repeater.
Figure 3:
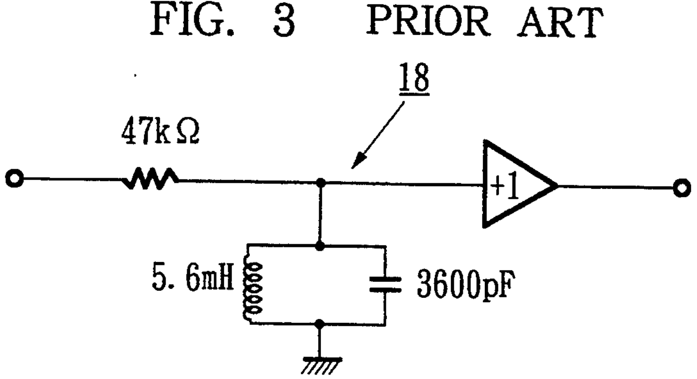
FIG. 3 PRIOR ART
FIG. 3 is a circuit diagram showing a prior art bandpass filter.
Figure 4:
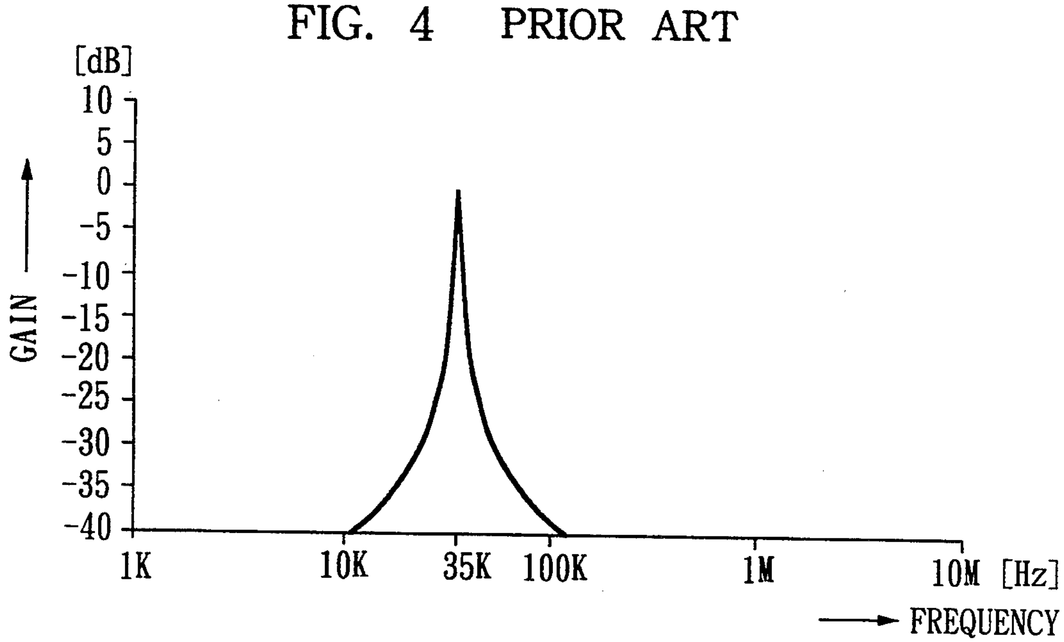
FIG. 4 PRIOR ART
FIG. 4 is a diagram showing a characteristic of the bandpass filter of FIG. 3.
Figure 5:
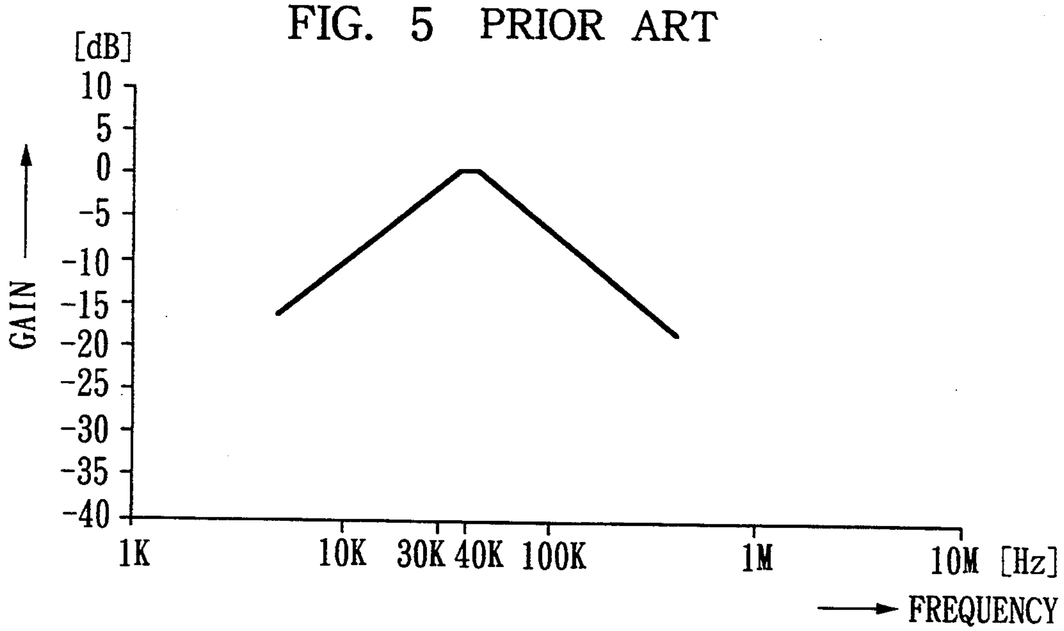
FIG. 5 PRIOR ART
FIG. 5 is a diagram showing a characteristic of another prior art bandpass filter.
Figure 6:
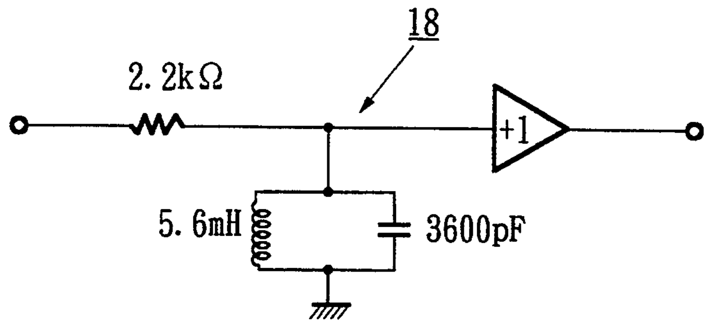
FIG. 6 is a circuit diagram showing the bandpass filter of FIG. 3 in which values of the elements are changed.
Figure 7:
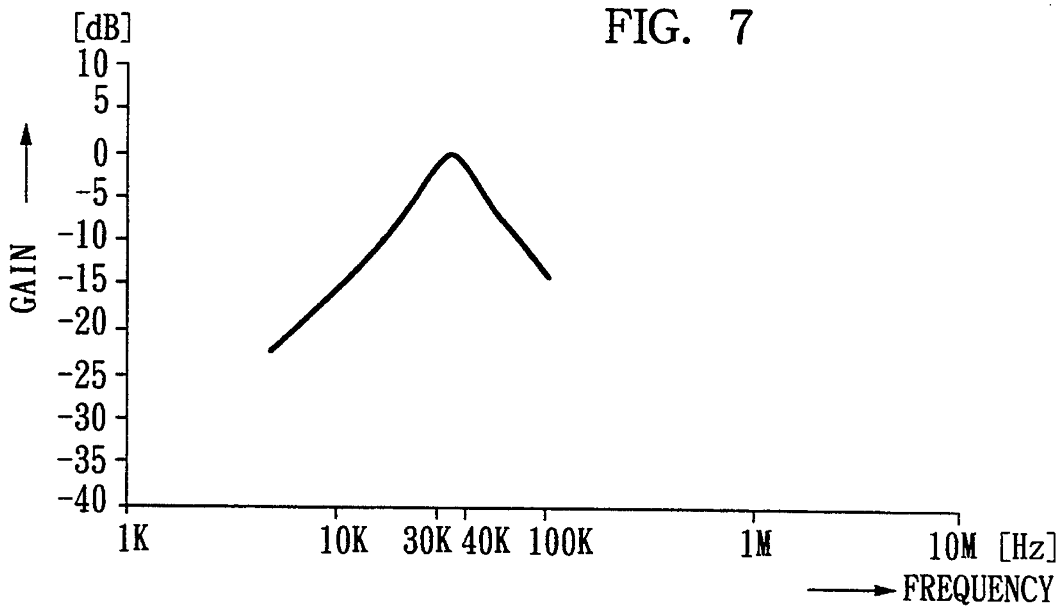
FIG. 7 is a diagram showing a characteristic of the bandpass filter of FIG. 6.

An example of the bandpass filter incorporated in the repeater of the invention is shown in FIG. 1. This bandpass filter is used as the bandpass filter 18 of FIG. 2. A received remote control signal from the amplifier 17 (FIG. 2) is applied to an input terminal 32. This signal is supplied to a parallel LC resonant circuit 84 and a serial LC resonant circuit 86 through resistance R1. The output of the serial LC resonant circuit 36 is supplied to an output terminal 40 through a buffer amplifier 38 and thereafter supplied to the level slicer 19 (FIG. 2).

The parallel LC resonant circuit 34 is constructed of a coil L1 as an inductor and a capacitor C1. The serial LC resonant circuit 36 is constructed of a capacitor C2 and a coil L2 as an inductor. The resistance R1 is provided as braking resistance to the serial resonance. Resistance R2 is provided for damping Q. Values of the respective elements of the parallel LC resonant circuit 34 and the serial LC resonant circuit 36 are determined substantially at $$C1 \cdot L1 = C2 \cdot L2 \quad (1)$$

to substantially equalize the parallel resonant frequency with the serial resonant frequency (in this example, 35 kHz).

Figure 8:
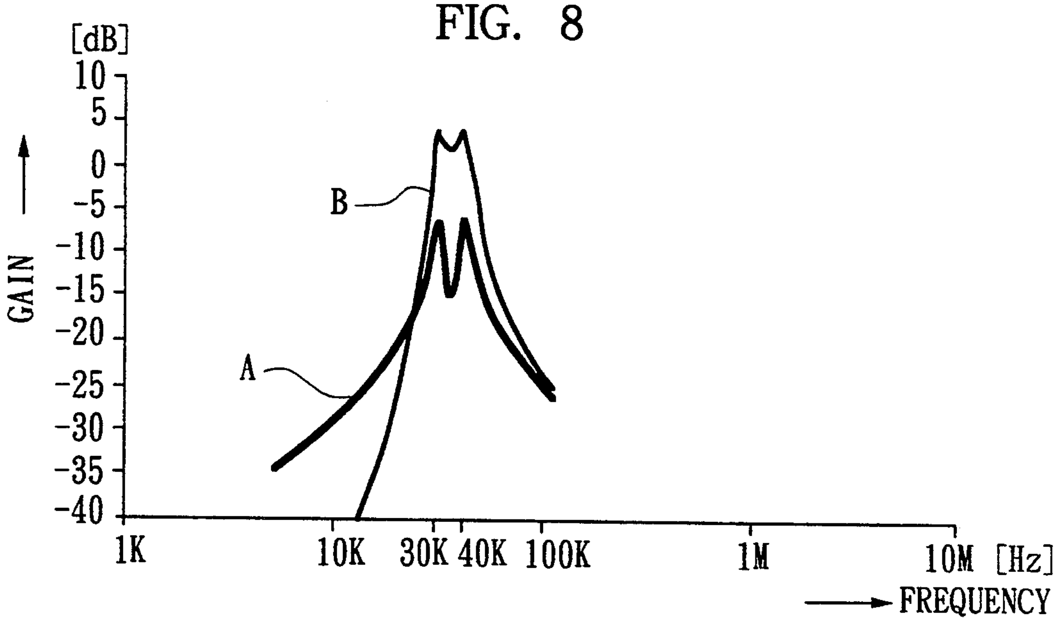
FIG. 8 is diagram showing a characteristic of the bandpass filter of FIG. 1.

Frequency characteristics at points A and B in the circuit of FIG. 1 are shown in FIG. 8. A resonance having two peaks on sides of the resonance frequency (35 kHz) produced originally by C1 and L1 is produced at the point A. This is because the addition of C2 and L2 causes resonance by L1 and C1+C2 to be produced on the lower side of 35 kHz and resonance by C1 and L1//L2(parallel inductance of L1 and L2) to be produced on the higher side of 35 kHz. In this example, the ratio of C1 and C2 is determined so that 30 kHz and 40 kHz become the resonant frequencies to match the selected band width of 30 kHz–40 kHz. In case the band is to be widened, this ratio may be made smaller and in case the band is to be narrowed, this ratio may be made larger. In these cases, values of L1 and L2 are also changed to satisfy the above equation (1).

At the point B, the serial resonant characteristic is added to the above described resonant characteristic at the point A and, as a result, as shown by a curve B in FIG. 8, a characteristic having a substantially flat characteristic in a portion between 30 kHz and 40 kHz is provided. This frequency characteristic has sharply inclining portions on sides of the band of 30 kHz to 40 kHz so that noises outside of the band are hardly picked up by the bandpass filter 18. Particularly, the sharp attenuating characteristic on the lower frequency side is effective for cutting off a noise produced by a fluorescent lamp.

Figure 9:
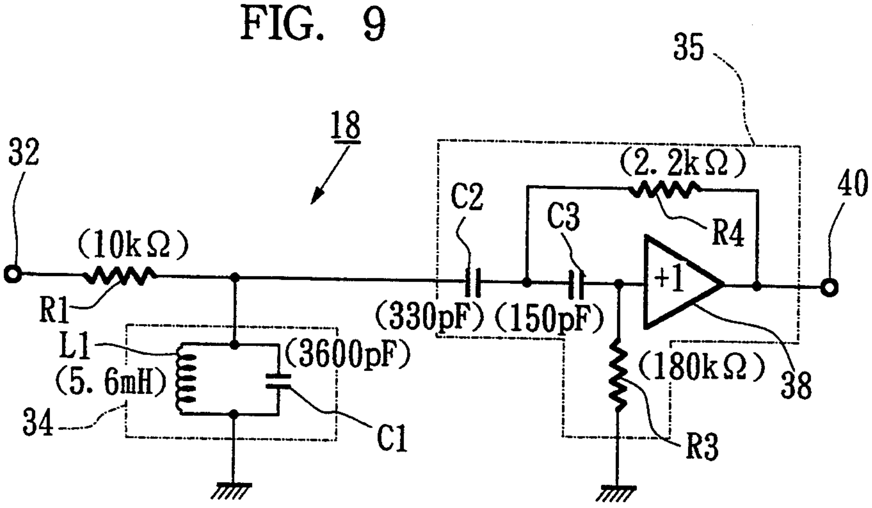
FIG. 9 is a circuit diagram showing another example of the bandpass filter incorporated in the repeater of the invention.
Figure 10:
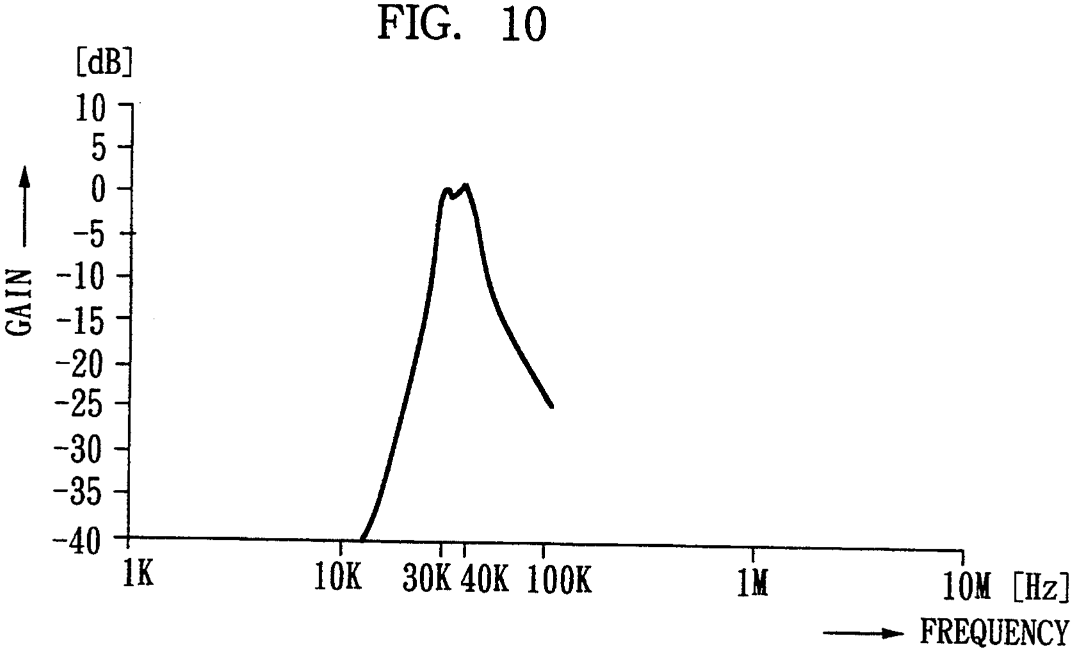
FIG. 10 is a diagram showing a characteristic of the bandpass filter of FIG. 9.

As the coil L2 of FIG. 1, a coil of a large inductance value is required. It is therefore more economical to construct it with an electrically simulated inductor. An example adopting this simulated inductor construction is shown in FIG. 9. In this example, the coil L2 and the buffer amplifier 38 of the bandpass filter 18 of FIG. 1 are replaced by a combination of a capacitor resistances R3 and R4 and a buffer amplifier 38. In this example, the serial LC resonant circuit 35 is constructed without using the coil L2. The frequency characteristic of the circuit of FIG. 9 is shown in FIG. 10. It will be noted from this diagram that a frequency characteristic which is substantially equivalent to the characteristic of the circuit of FIG. 1 (the characteristic B in FIG. 8) is obtained.

Figure 11:
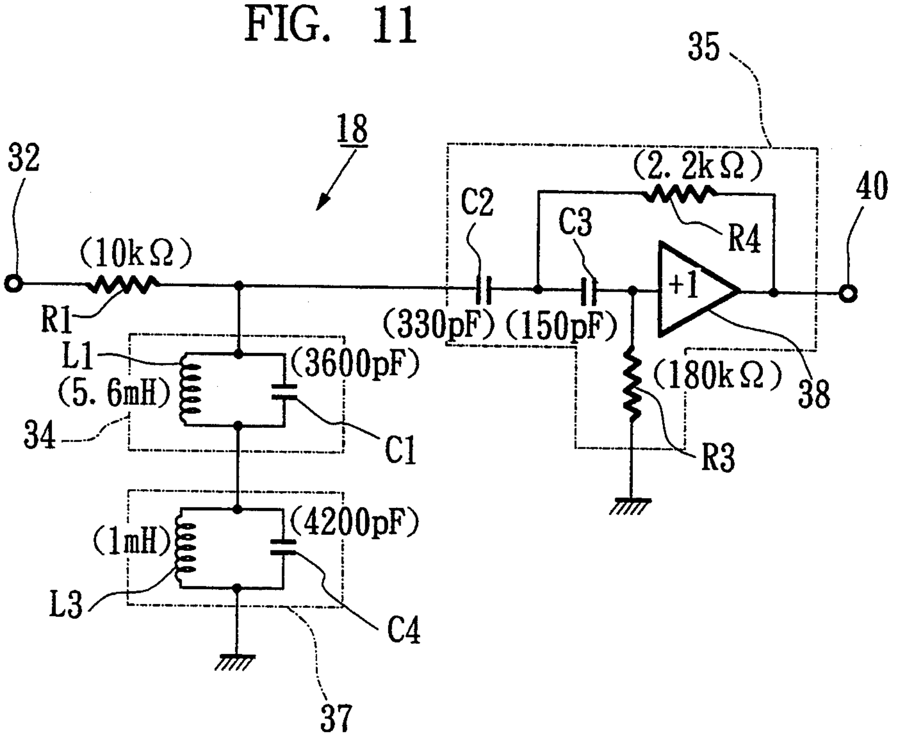
FIG. 11 is a circuit diagram showing another example of the bandpass filter incorporated in the repeater of the invention.
Figure 12:
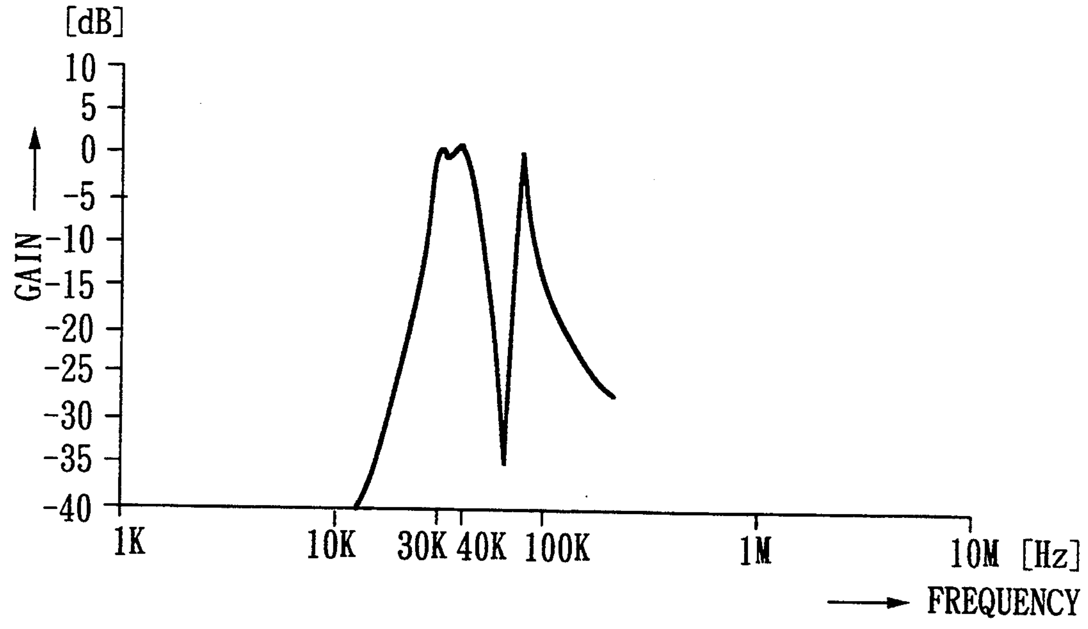
FIG. 12 is a diagram showing a characteristic of the bandpass filter of FIG. 11.

Although carrier frequencies of infrared remote control signals are mostly within the range from 30 kHz to 40 kHz, there is exceptionally a carrier frequency which is quite different from this frequency range. A typical example is a remote control signal for a cable television (80 kHz). In operating such device, if the necessary band is simply expanded to 30 kHz to 80 kHz, the signal-to-noise ratio will be deteriorated. For avoiding this, it is preferable to add a necessary frequency instead of expanding the band. An example adopting such construction is shown in FIG. 11. This circuit is obtained by inserting another parallel LC resonant circuit 37 between the parallel LC resonant circuit 34 and the ground in the circuit of FIG. 9. The parallel LC resonant circuit 37 is constructed of a coil L3 and a capacitor C4 and its resonant frequency is set at 80 kHz. Since this resonant frequency of 80 kHz is largely different from the resonant frequency of the parallel LC resonant circuit 84 and the serial LC resonant circuit 36, the resonant frequency of the parallel LC resonant circuit 37 hardly affects the frequency characteristics obtained by these resonant circuits 34 and 36. The characteristic produced by the circuit of FIG. 11 is shown in FIG. 12. According to this characteristic, a flat characteristic is obtained in the portion between 30 kHz and 40 kHz, a peak characteristic is obtained at 80 kHz and sharp attenuation characteristics are obtained in other portions.

In the above described embodiment, the inductor 35 only is constructed of an electrically simulated inductor but the other inductors 34 and 37 may be likewise constructed of electrically simulated inductors.

Figure 13:
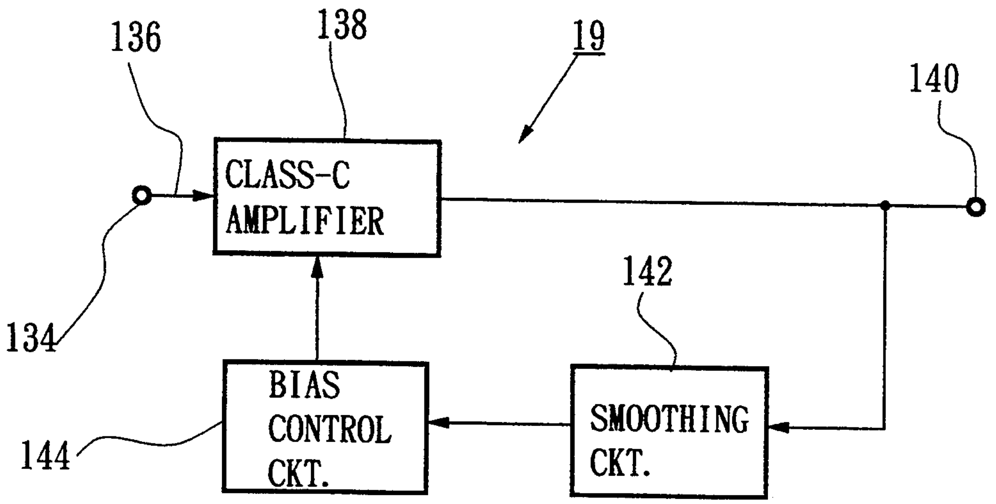
FIG. 13 is a block diagram showing an example of the level slicer incorporated in the repeater of the invention.
Figure 14:
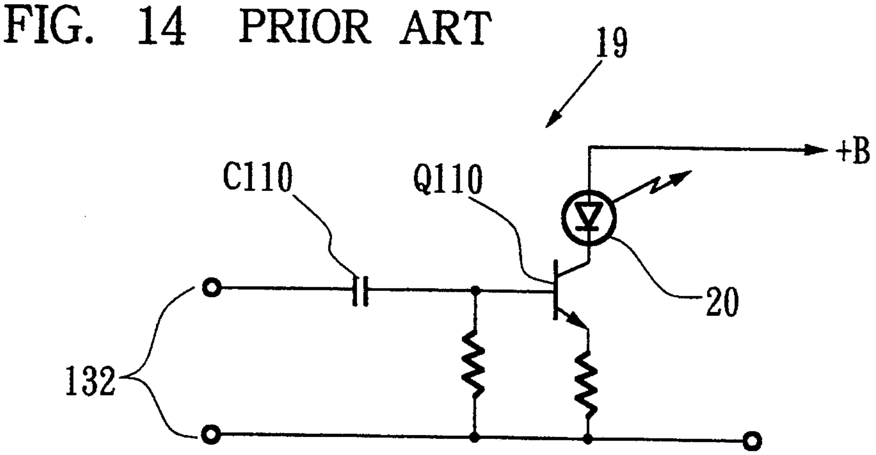
FIG. 14 PRIOR ART
FIG. 14 is a circuit diagram showing a prior art level slicer.

An example of a level slicer incorporated in the repeater according to the invention will now be described. FIG. 13 schematically shows an example of a level slicer 19 of the invention. A received remote control signal 136 which has passed through the band (e.g., 30 kHz to 40 kHz) of the bandpass filter 18 (FIG. 2) is applied to an input terminal 134. This remote control signal 136 is subjected to level slicing by a variable class-C bias in a class-C bias amplifying circuit. 138 and thereafter is supplied from an output terminal 140 to the light emitting element 20 such as an infrared LED (FIG. 2).

A smoothing circuit 142 smoothes the received remote control signal 136 with a predetermined time constant for detecting an average level of the remote control signal. A bias control circuit 144 variably controls the degree of the class-C bias in accordance with the output of the smoothing circuit 142. More specifically, when the output of the smoothing circuit 142 increases, the class-C bias is increased whereas when the output of the smoothing circuit 142 decreases, the class-C bias is decreased. By determining the relation between the smoothed output and the degree of the class-C bias so that the degree of the class-C bias is substantially equal to or larger than the level of an expected continuous noise, the class-C bias is increased to cut off the continuous noise and it is decreased pass the remote control signal 136. Therefore, a continuous noise can be effectively eliminated. When a continuous noise is superposed on a remote control signal, the class-C bias becomes a level which is sufficient to cut off the continuous noise, so that the remote control signal only can be extracted.

When the time constant of the smoothing circuit 142 is too short, the class-C bias becomes sensitive even to the intermittent arrival of the pulses of the remote control signal with a result that the class-C bias is changed excessively to cut off the remote control signal. Conversely, when the time constant of the smoothing circuit 142 is too long, it takes unduly long time before the class-C bias increases after arrival of a continuous noise with a result that the continuous noise is retransmitted during this transient time. The time constant of the smoothing circuit 142 should therefore be determined at a suitable value at which no such inconveniences will arise. In most remote control signals, a carrier lasting for 2–3 ms ("H" level) appears, then there is a rest period ("L" level) of the same or a larger time length and then the carrier of 2–3 ms appears again. A time constant of about 50 ms will be a suitable value for such remote control signals.

Figure 18:
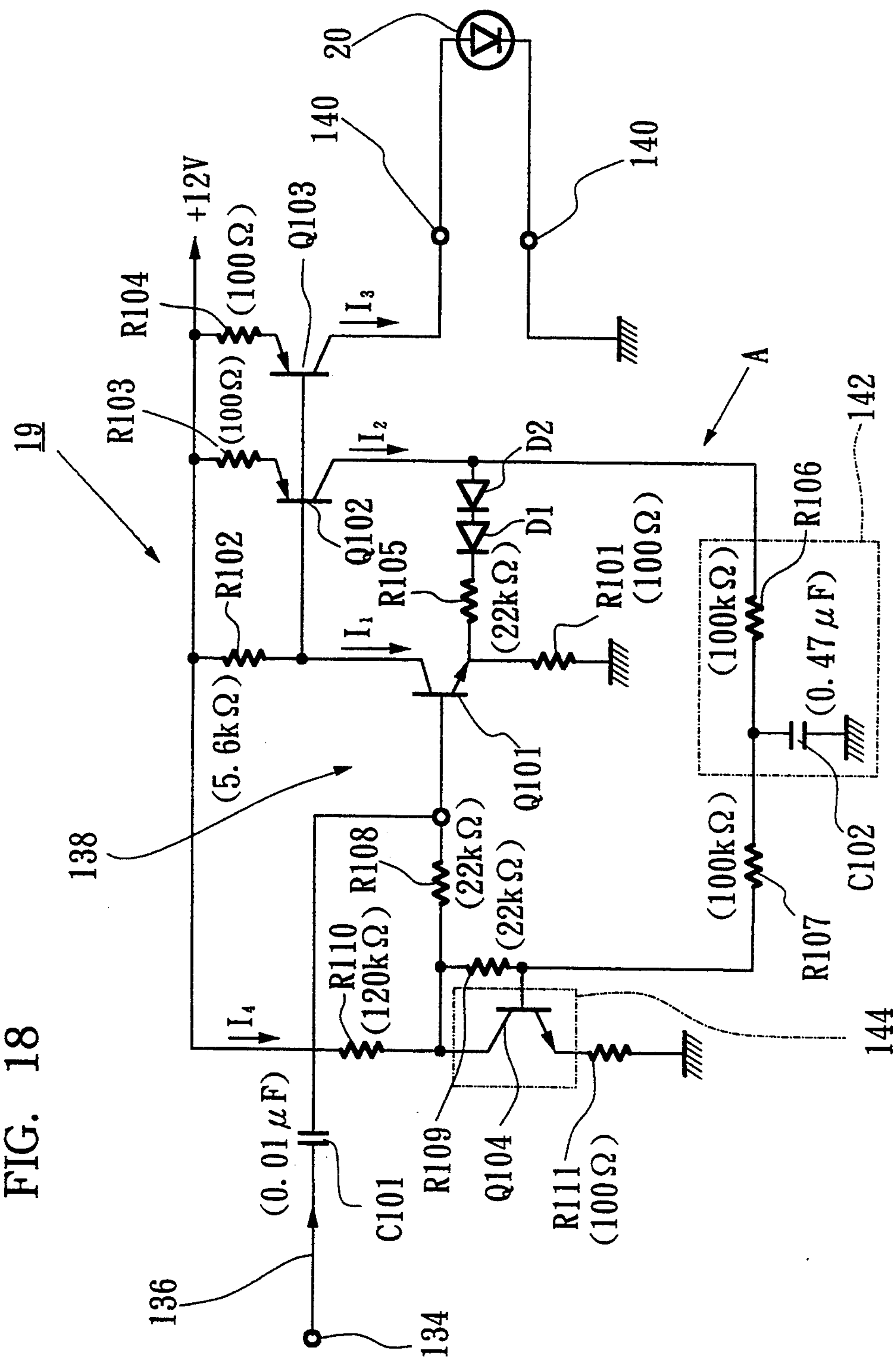
FIG. 18 is a circuit diagram showing a specific example of the level slicer of FIG. 13.

A specific example of the level slicer 19 of FIG. 13 is shown in FIG. 18. A received remote control signal 136 is applied to an input terminal 134 and, after its dc component is removed by a capacitor 101, the signal is applied to the base of a transistor Q101 which constitutes the class-C bias amplifying circuit 138. A resistance R110, a transistor Q104 and resistance R111 constitute a bias circuit for causing the transistor Q101 to operate to the class-C bias amplifier. The transistor Q104 controls the degree of the class-C bias as a bias control circuit 144. This transistor Q104 performs also a function of compensating temperature.

A constant collector current I4 flows through the resistance R110 to the transistor Q104. A bias is applied from the collector to the base of the transistor Q104 by the resistance R109. A bias is also applied to the base of the transistor Q101 by the resistance R108 of the same resistance value of the R109.

Since the same bias voltage is applied to the transistors Q104 and Q101, collector current I1 of the transistor Q101 becomes equal to collector current I4 of the transistor Q104 by determining the emitter resistances R11 and R101 at the same value.

Figure 15:
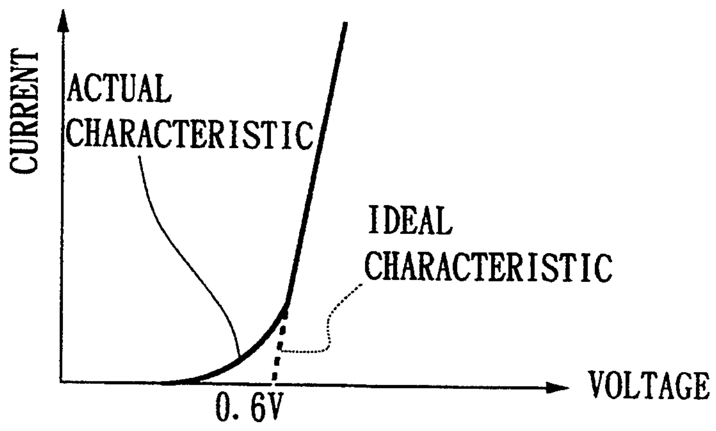
FIG. 15 PRIOR ART
FIG. 15 is a diagram showing rising characteristic of a transistor.
Figure 16:
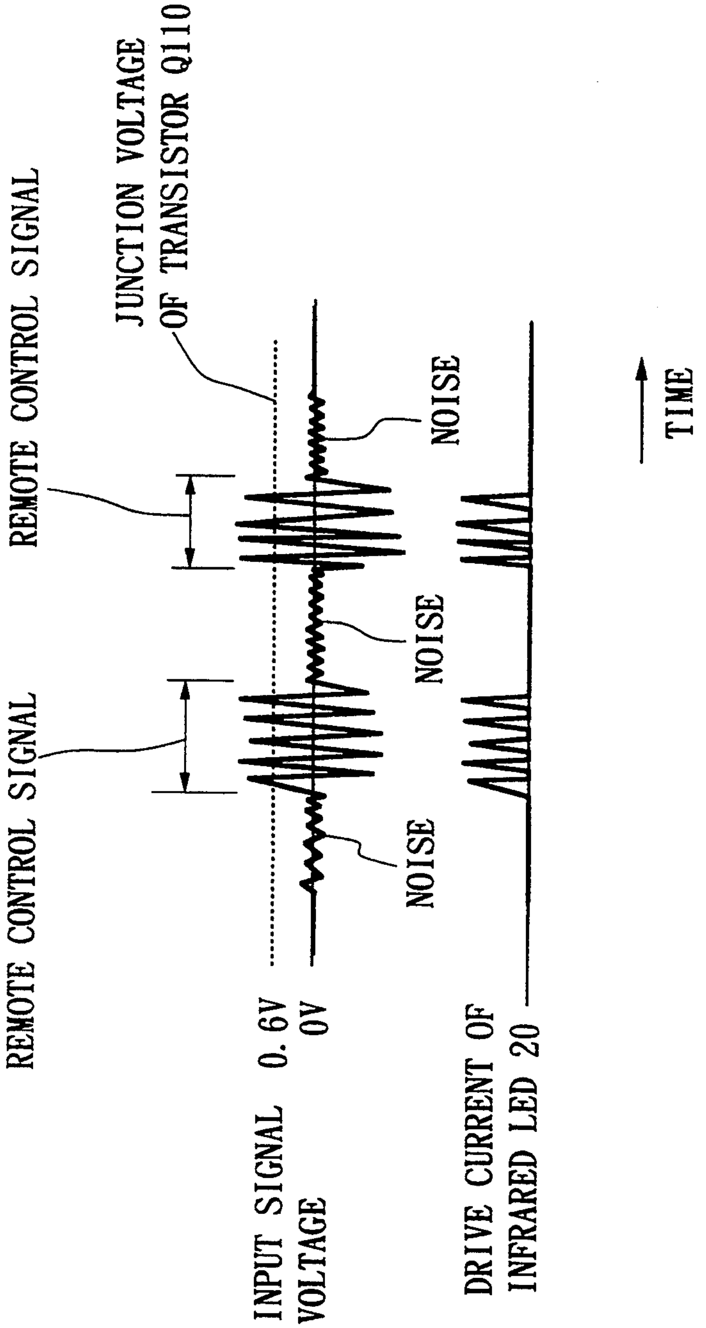
FIG. 16 is a waveform diagram showing the operation of the circuit of FIG. 14.
Figure 17:
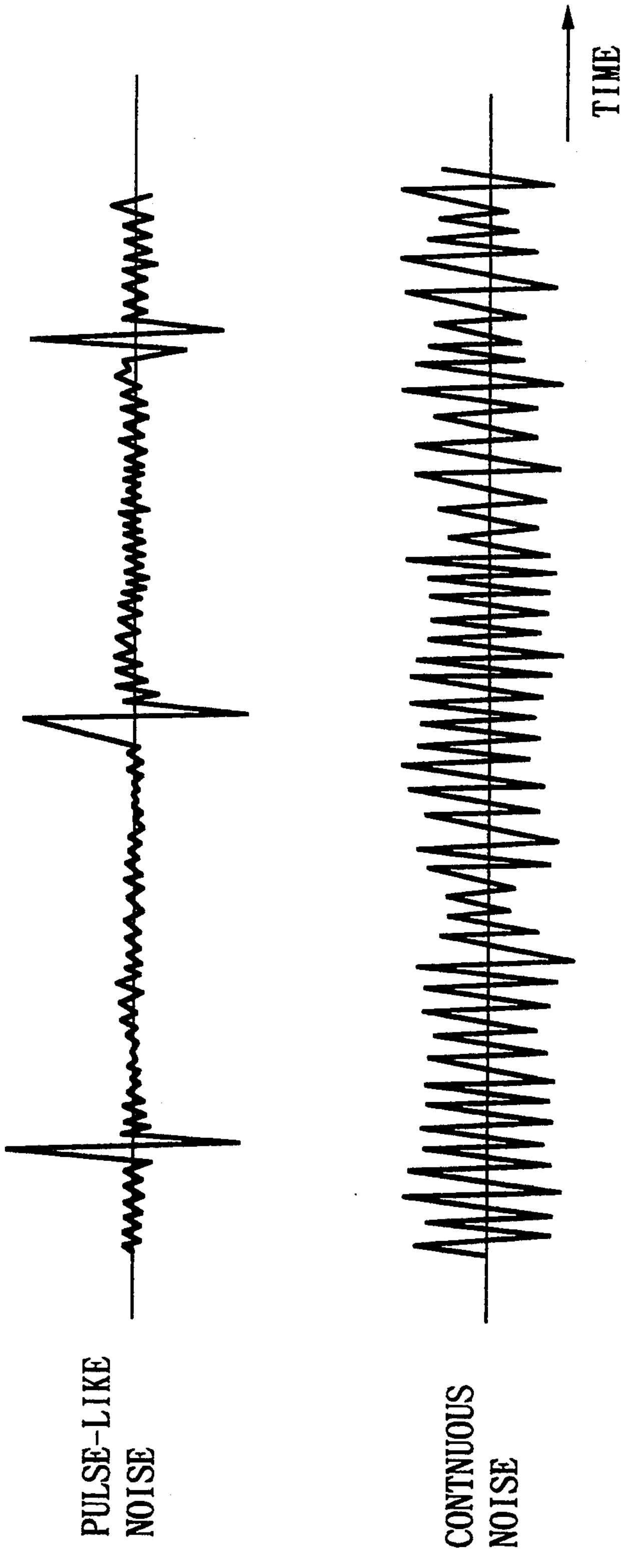
FIG. 17 is a waveform diagram showing types of noise waveforms.
Figure 19:
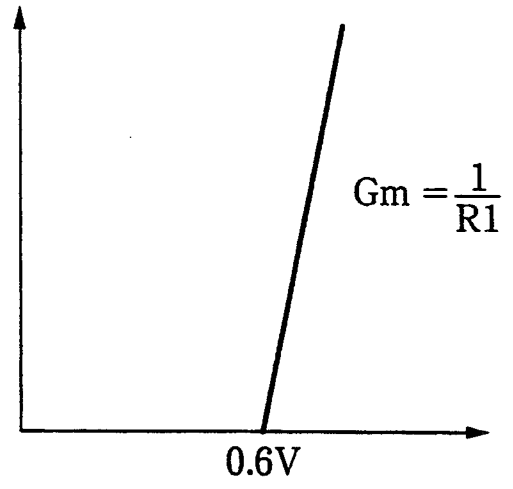
FIG. 19 is a diagram showing rising characteristic of transistor Q101 in FIG. 18.

The collector of the transistor Q101 is connected to the base of the transistor Q102 and the collector of the transistor Q102 is connected to the emitter of the transistor Q101 through diodes D1, D2 and resistance R105, thereby forming a feedback circuit, The voltage-current conversion characteristic of this feedback circuit is determined by the resistance R101 as shown in FIG. 19. Gm (mutual conductance) of the circuit becomes 1/R101 so that this characteristic rises sharply at an input of about 0.6 V or more. Accordingly, the ideal characteristic shown by the dotted line in FIG. 15 can be obtained.

The base of the transistor Q103 is connected to the base of the transistor Q102 and a light emitting infrared LED 20 is connected to the collector of the transistor Q103 through an output terminal 140. By setting the resistances R103 and R104 to the same value, collector current I3 which is equal to collector current I2 of the transistor Q102 flows to the transistor Q103 and the infrared LED 20 is driven by this current I3. The resistance R102 connected to the collector of the transistor Q101 is set to a value at which the base voltage of the transistors Q102 and Q103 on the basis of current I1 during absence of an input signal becomes a value immediately before these transistors Q102 and Q103 are turned on so that currents I2 and I3 during absence of an input signal become almost zero.

The smoothing circuit 142 is constructed of a resistance R106 and a capacitor C102 and smoothes the collector output of the transistor Q102. The smoothed output of the smoothing circuit 142 is supplied to the base of the transistor Q104 through resistance R107.

Figure 21:
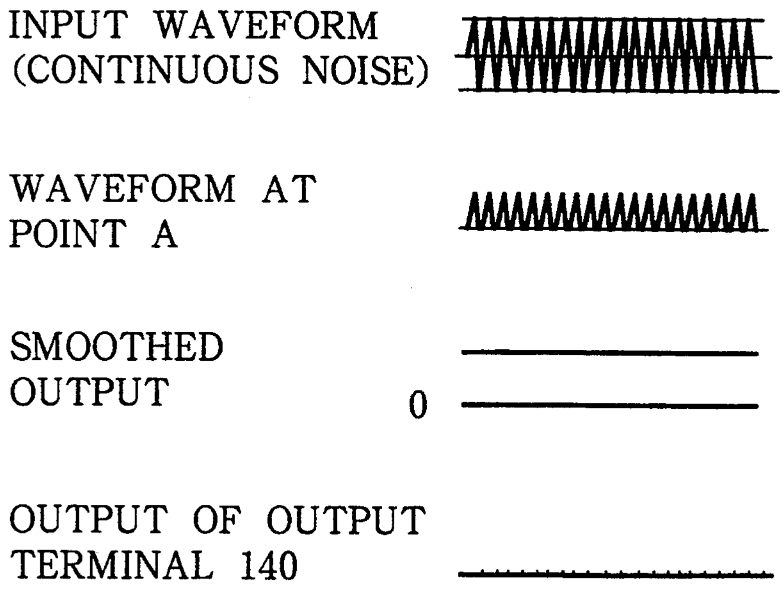
FIG. 21 is a waveform diagram showing the operation when a continuous noise has been applied to the circuit of FIG. 18.
Figure 20A:
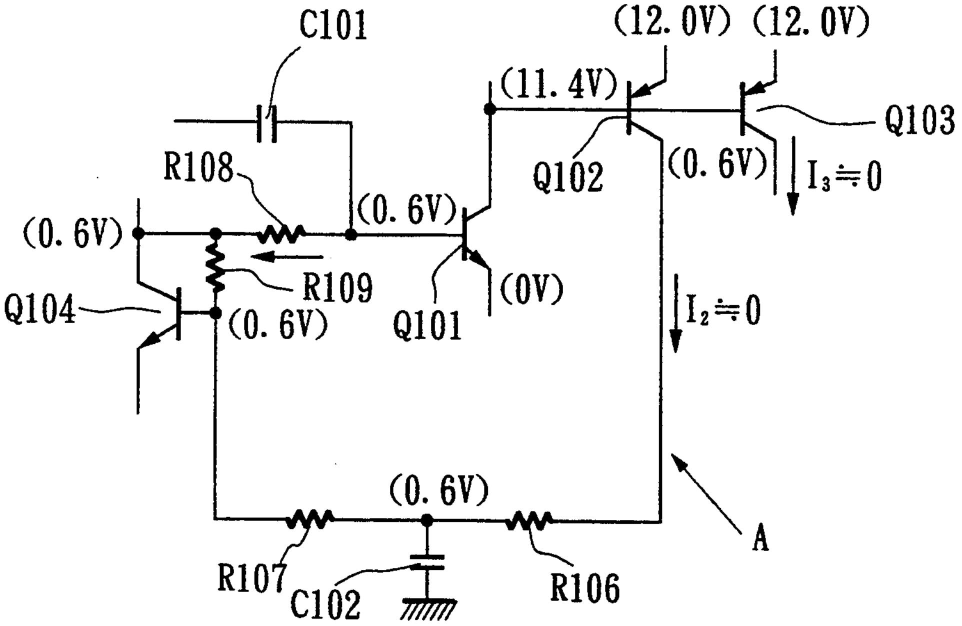
Figure 20B:
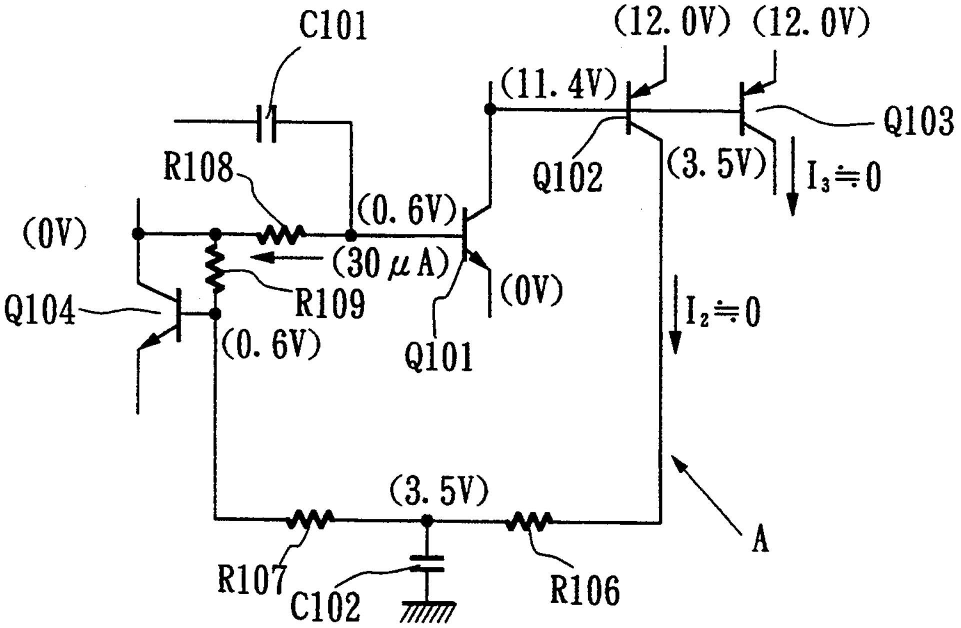

A state of voltage distribution during absence of an input signal in the level slicer of the above structure is shown in FIG. 20A. In this state, the collector currents I2 and I3 of the transistors Q102 and Q103 are almost zero and, therefore, the infrared LED 20 is not driven. Upon application of an input signal in this state, a waveform of a positive side only of an input signal only appears at the point A and thereby is detected. This output is smoothed by the smoothing circuit 142 and is applied to the base of the transistor Q104 through the resistance R107 whereby as the level of the input signal increases, the collector voltage of the transistor Q104 decreases and the base bias voltage of the transistor Q101 decreases (i.e., the class-C bias increases). When the input signal is a continuous noise, its smoothed output is large and therefore the class-C bias rather increases. The state of voltage distribution when the input continuous noise is at the maximum is shown in FIG. 20B. In this state, the collector currents I2 and I3 of the transistors Q2 and Q3 are almost zero so that the infrared LED 20 is not driven. Alternatively stated, the bias increases not to output the continuous noise. FIG. 21 shows waveforms appearing at this time in some parts of the level slicer.

Figure 22:
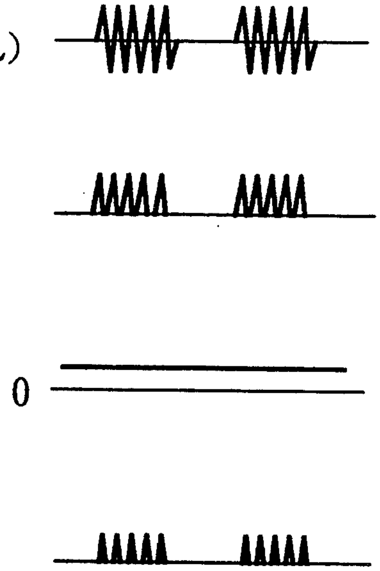
FIG. 22 is a waveform diagram showing the operation when a remote control signal has been applied to the circuit of FIG. 18.

When a remote control signal which is an intermittent signal has been applied, the smoothed output becomes small and the class-C bias therefore decreases as compared with the case of continuous noise. A current corresponding to the level of the remote control signal therefore flows the transistors Q102 and Q103 thereby causing the infrared LED 20 to output the remote control signal. FIG. 22 shows waveforms appearing in the respective parts of the level slicer 19. When a remote control signal has been transmitted from a distant location, the level of the received signal is low but the class-C bias decreases to enable the infrared LED 20 to transmit the remote control signal.

Figure 23:
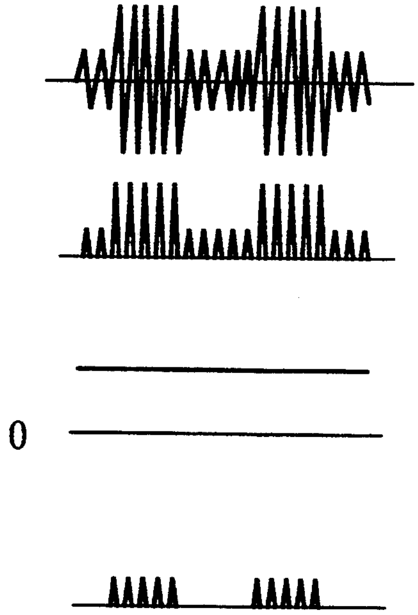
FIG. 23 is a waveform diagram showing the operation when a combined continuous noise and remote control signal has been applied to the circuit of FIG. 18.

When an input signal is a mixed signal, i.e., a combination of a continuous noise superposed on a remote control signal, the class-C bias is applied at a degree which is sufficient to cut off the continuous noise, so that the remote control signal only can be outputted from the infrared LED 20. FIG. 23 shows waveforms appearing in the respective parts of the level slicer 19 in this state.

In the circuit of FIG. 18, diodes D1 and D2 are inserted because, without them, charge of the capacitor C102 will flow to the emitter side of the transistor Q101 during absence of an input signal and, in this case, it will become difficult to stably obtain a smoothed output for controlling the degree of the class-C bias. The diodes D1 and D2 are inserted also for limiting a load for the transistor Q102 to the resistance R106 when the transistor Q102 has started to be turned on and interrupting a feedback loop to the emitter of the transistor Q101 and thereby increasing gain of the transistor Q102 to improve its response characteristic.

Figure 24:
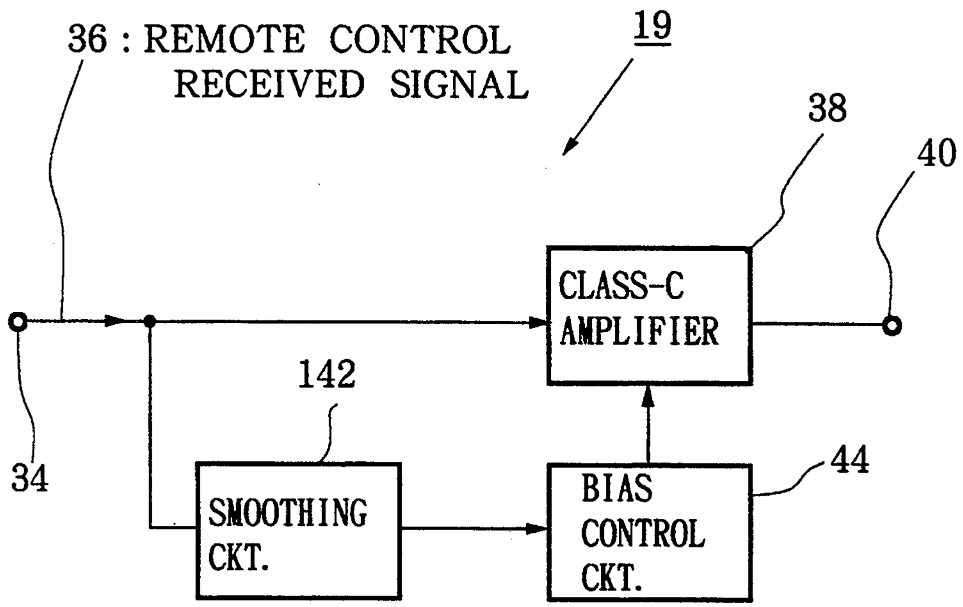
FIG. 24 is a block diagram showing another example of the level slicer.

FIG. 24 shows a modified example of the level slicer shown in FIG. 13. The modified level slicer does not control class-C bias in response to the output of the class-C amplifier as shown in FIG. 13 but controls bias in response to the level of a signal on the input side of the amplifier. In FIG. 24, component parts corresponding in their basic construction to those in FIG. 13 are designated by the same reference characters.

The above embodiments have been described about a case where an infrared signal is used as the remote control signal. The invention is applicable also to a remote control using a radio wave as a remote control signal.

What is claimed is:

1. A remote control signal repeater which transmits a remote control signal from a remote controller to a main device, the remote control signal having a carrier frequency within a predetermined frequency range, the remote control signal repeater comprising:

signal receiving means for receiving a remote control signal produced by the remote controller;

bandpass filter means for filtering the received signal and outputting a filtered signal within the predetermined frequency range, the bandpass filter means comprising:

a first parallel resonant circuit having a resonant frequency;

a serial resonant circuit connected to the first parallel resonant circuit, the serial resonant circuit having substantially the same resonant frequency as the resonant frequency of the first parallel resonant circuit; and remote control signal output means for transmitting the filtered signal to the main device.

2. A remote control signal repeater as defined in claim 1 wherein the first parallel resonant circuit and the serial resonant circuit each have time constants which are so determined that the resonant frequency of the parallel resonant circuit is substantially a center frequency in the predetermined frequency range.

3. A remote control signal repeater as defined in claim 1 wherein the first parallel resonant circuit comprises inductance and capacitance in parallel connection and the serial resonant circuit comprises inductance and capacitance in series connection.

4. A remote control signal repeater as defined in claim 3 wherein at least one of the inductances comprises a coil.

5. A remote control signal repeater as defined in claim 3 wherein at least one of the inductances comprises an electrically simulated inductor.

6. A remote control signal repeater as defined in claim 1 wherein the bandpass filter means further comprises a second parallel resonant circuit having a different resonant frequency from the resonant frequency of the first parallel resonant circuit and the serial resonant circuit and being connected to the first parallel resonant circuit in series.

7. A remote control signal repeater which transmits a remote control signal from a remote controller to a main device, the remote control signal being a pulse signal having a carrier frequency, the remote control signal repeater comprising:

signal receiving means for receiving the remote control signal;

level slicing means for cutting off noise in a pulse remote control signal received by the signal receiving means by removing a signal component below a desired level, the level slicing means comprising:

class-C bias amplifying means for class-C bias amplifying the received pulse remote control signal and generating an output signal;

smoothing means for smoothing the output signal of the class-C bias amplifying means using a predetermined time constant and generating a smoothing signal; and bias control means for controlling a class-C bias amount of the class-C bias amplifying means in response to the smoothing signal; and remote control signal output means for receiving the output signal and transmitting the output signal to the main device.

8. A remote control signal repeater as defined in claim 7 further comprising filter means, the filter means receiving the pulse remote control signal received by the signal receiving means and passing a frequency component signal within a predetermined frequency range from the received pulse remote control signal to the level slicing means.

9. A remote control signal repeater which transmits a remote control signal from a remote controller to a main device, the remote control signal being a pulse signal having a carrier frequency, the remote control signal repeater comprising:

signal receiving means for receiving the remote control signal;

level slicing means for cutting off noise in the pulse remote control signal received by the signal receiving means by removing a signal component below a desired level, the level slicing means comprising:

class-C bias amplifying means for class-C bias amplifying the received pulse remote control signal and generating an output signal;

smoothing means for smoothing the output signal with a predetermined time constant and providing a smoothed output; and bias control means for variably controlling a class-C bias amount of the class-C bias amplifying means in response to the smoothed output of the smoothing means;

remote control signal output means for receiving the output signal and transmitting the output signal to the main device.

10. A remote control signal repeater as defined in claim 3 wherein at least one of the inductances comprises a capacitance in series with a buffer amplifier.

11. A remote control signal repeater as defined in claim 1 wherein the serial resonant circuit comprises in series a capacitance and an electrically simulated inductor.

12. A remote control signal repeater as defined in claim 1 wherein:

the remote controller comprises a plurality of remote control means; and the main device comprises a plurality of remote control devices.

13. A remote control signal repeater as defined in claim 8 wherein the filter means comprises:

a first parallel resonant circuit having a resonant frequency and connected in parallel to the signal receiving means and a serial resonant circuit;

the serial resonant circuit being connected to the first parallel resonant circuit and in series with the signal receiving means, the serial resonant circuit having substantially the same resonant frequency as the resonant frequency of the first parallel resonant circuit.

14. A remote control signal repeater as defined in claim 13 wherein the filter means further comprises a second parallel resonant circuit having different resonant frequency from the resonant frequency of the first parallel resonant circuit and the serial resonant circuit and being connected in series to the first parallel resonant circuit.

15. A remote control signal repeater as defined in claim 7 wherein:

the remote controller comprises a plurality of remote control means; and the main device comprises a plurality of remote control devices.

* * * * *